US011834969B2

(12) United States Patent
Hamasaki et al.

(10) Patent No.: US 11,834,969 B2
(45) Date of Patent: Dec. 5, 2023

(54) STEAM TURBINE PLANT AND CONTROL DEVICE, AND WATER QUALITY MANAGEMENT METHOD FOR STEAM TURBINE PLANT

(71) Applicant: Mitsubishi Power, Ltd., Kanagawa (JP)

(72) Inventors: Akihiro Hamasaki, Yokohama (JP); Haruka Kido, Yokohama (JP); Mitsuru Nakamoto, Yokohama (JP); Senichi Tsubakizaki, Yokohama (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 52 days.

(21) Appl. No.: 17/630,237

(22) PCT Filed: Sep. 25, 2020

(86) PCT No.: PCT/JP2020/036245
§ 371 (c)(1),
(2) Date: Jan. 26, 2022

(87) PCT Pub. No.: WO2021/060457
PCT Pub. Date: Apr. 1, 2021

(65) Prior Publication Data

US 2022/0282639 A1 Sep. 8, 2022

(30) Foreign Application Priority Data

Sep. 25, 2019 (JP) ................................ 2019-174104

(51) Int. Cl.
*F01K 9/00* (2006.01)
*C02F 1/66* (2023.01)
(Continued)

(52) U.S. Cl.
CPC .................. *F01K 9/00* (2013.01); *C02F 1/66* (2013.01); *F01D 25/00* (2013.01); *F22B 37/56* (2013.01);
(Continued)

(58) Field of Classification Search
CPC ...... F01K 9/00; F01K 7/06; C02F 1/66; C02F 2209/005; C02F 2209/05; C02F 2303/08;
(Continued)

(56) References Cited

U.S. PATENT DOCUMENTS

2006/0067455 A1* 3/2006 Hosokawa ............. G21C 19/42
376/310
2006/0157420 A1* 7/2006 Hays ......................... C02F 1/70
210/757
(Continued)

FOREIGN PATENT DOCUMENTS

CN 103884007 6/2014
JP 2002-180804 6/2002
(Continued)

OTHER PUBLICATIONS

International Search Report dated Nov. 2, 2020 in corresponding International Application No. PCT/JP2020/036245.
(Continued)

*Primary Examiner* — Hoang M Nguyen
(74) *Attorney, Agent, or Firm* — Wenderoth, Lind & Ponack, L.L.P.

(57) ABSTRACT

A steam turbine plant includes a chemical supply part configured to supply a pH adjuster to feedwater to a steam generator, an adjustment part for adjusting a supply amount of the pH adjuster to the feedwater by the chemical supply part, and at least one carbon steel component that includes a pipe or a device formed from carbon steel and through which the feedwater flows, the carbon steel component
(Continued)

being configured such that an internal temperature at least partially falls within a range of not less than 120° C. and not greater than 180° C. under load operating condition of the steam turbine plant. The adjustment part is configured to, under the load operating condition, adjust the supply amount of the pH adjuster such that pH of the feedwater in each of the at least one carbon steel component is not less than 9.8.

5 Claims, 2 Drawing Sheets

(51) Int. Cl.
*F01D 25/00* (2006.01)
*F22B 37/56* (2006.01)
*F22D 11/00* (2006.01)

(52) U.S. Cl.
CPC ........ *F22D 11/006* (2013.01); *F05D 2220/31* (2013.01); *F05D 2260/60* (2013.01)

(58) Field of Classification Search
CPC ........ F01D 25/00; F22B 37/56; F22D 11/006; F22D 11/00; F05D 2220/31; F05D 2260/60
USPC .......................................... 60/646, 657, 660
See application file for complete search history.

(56) References Cited

U.S. PATENT DOCUMENTS

2012/0296147 A1* 11/2012 Swearingen .............. C02F 9/00 588/318
2016/0096744 A1* 4/2016 Rutsch .................... C02F 1/048 60/657
2016/0222831 A1* 8/2016 Tanaka ................ C02F 1/46104

FOREIGN PATENT DOCUMENTS

| | | |
|---|---|---|
| JP | 2007-131913 | 5/2007 |
| JP | 4043328 | 2/2008 |
| JP | 2008-107040 | 5/2008 |
| JP | 2008-164208 | 7/2008 |
| JP | 4233746 | 2/2009 |
| JP | 2016-61474 | 4/2016 |

OTHER PUBLICATIONS

International Preliminary Report on Patentability dated Apr. 7, 2022 in corresponding International Application No. PCT/JP2020/036245, with English language translation.

* cited by examiner

Control device
Low-pressure drum
Intermediate-pressure drum
High-pressure drum
C
1
2
3
4
6
8
10
12
22
24
25
26
27
28
32
33a(72)
33b(72)
33c(72)
34
35
36
37
38
42 (72)
44(72)
45 (72)
46(72)
47 (72)
48
50
52
53
54
56
60
70

STEAM TURBINE PLANT AND CONTROL DEVICE, AND WATER QUALITY MANAGEMENT METHOD FOR STEAM TURBINE PLANT

TECHNICAL FIELD

The present disclosure relates to a steam turbine plant and a control device, and a water quality management method for the steam turbine plant.

BACKGROUND

In a steam turbine plant, corrosion may be caused in a device in contact with feedwater, and measures to inhibit such corrosion are proposed.

For example, Patent Document 1 describes adding a pH adjuster to feedwater in a steam drum for the steam turbine plant, in order to maintain pH of the feedwater within an appropriate range where corrosion is hardly caused. Patent Document 1 uses ammonia as the pH adjuster to regulate, based on a partition factor of a gas phase and a liquid phase (gas-liquid partition coefficient) of ammonia in the steam drum, an ammonia concentration in the feedwater to be supplied to the steam drum such that the ammonia concentration in the feedwater in the steam drum falls within a predetermined range and pH of the feedwater in the steam drum falls within the appropriate range.

CITATION LIST

Patent Literature

Patent Document 1: JP4233746B

SUMMARY

Technical Problem

Meanwhile, in a steam turbine plant, in a pipe or a device in contact with feedwater in a temperature range of not less than 120° C. and not greater than 180° C., flow accelerated corrosion (FAC) may be caused, and in particular, in a case of a pipe or a device formed from relatively inexpensive carbon steel, a wastage speed due to the flow accelerated corrosion is high. Thus, in order to reduce the wastage in the pipe or the device exposed to an environment where the flow accelerated corrosion is likely to be caused, measures to adopt, as a material for these devices, a material (such as chrome molybdenum steel) having a low wastage speed due to flow accelerated corrosion may be taken. However, a high corrosion resistant material is relatively expensive, increasing a plant producing cost if such material is heavily used.

In view of the above, an object of at least one embodiment of the present invention is to provide a steam turbine plant and a control device, and a water quality management method for the steam turbine plant capable of reducing wastage due to flow accelerated corrosion, while suppressing the increase in plant producing cost.

Solution to Problem

A steam turbine plant according to at least one embodiment of the present invention includes a chemical supply part configured to supply a pH adjuster to feedwater to a steam generator, an adjustment part for adjusting a supply amount of the pH adjuster to the feedwater by the chemical supply part, and at least one carbon steel component which includes a pipe or a device formed from carbon steel and through which the feedwater flows, the carbon steel component being configured such that an internal temperature at least partially falls within a range of not less than 120° C. and not greater than 180° C. under load operating condition of the steam turbine plant. The adjustment part is configured to, under the load operating condition, adjust the supply amount of the pH adjuster such that pH of the feedwater in each of the at least one carbon steel component is not less than 9.8.

Further, a control device according to at least one embodiment of the present invention is a control device for a steam turbine plant including a chemical supply part configured to supply a pH adjuster to feedwater to a steam generator, and at least one carbon steel component which includes a pipe or a device formed from carbon steel and through which the feedwater flows, the carbon steel component being configured such that an internal temperature at least partially falls within a range of not less than 120° C. and not greater than 180° C. under load operating condition of the steam turbine plant. The control device is configured to, under the load operating condition, adjust the supply amount of the pH adjuster to the feedwater by the chemical supply part such that pH of the feedwater in each of the at least one carbon steel component is not less than 9.8.

Furthermore, a water quality management method for a steam turbine plant according to at least one embodiment of the present invention is a water quality management method for a steam turbine plant including at least one carbon steel component which includes a pipe or a device formed from carbon steel and through which feedwater flows, the carbon steel component being configured such that an internal temperature at least partially falls within a range of not less than 120° C. and not greater than 180° C. under load operating condition of the steam turbine plant, the water quality management method including a step of supplying a pH adjuster to the feedwater to a steam generator, and a step of, under the load operating condition, adjusting the supply amount of the pH adjuster such that pH of the feedwater in each of the at least one carbon steel component is not less than 9.8.

Advantageous Effects

According to at least one embodiment of the present invention, provided are a steam turbine plant and a control device, and a water quality management method for the steam turbine plant capable of reducing wastage due to flow accelerated corrosion, while suppressing an increase in plant producing cost.

DETAILED DESCRIPTION

Figure 1:
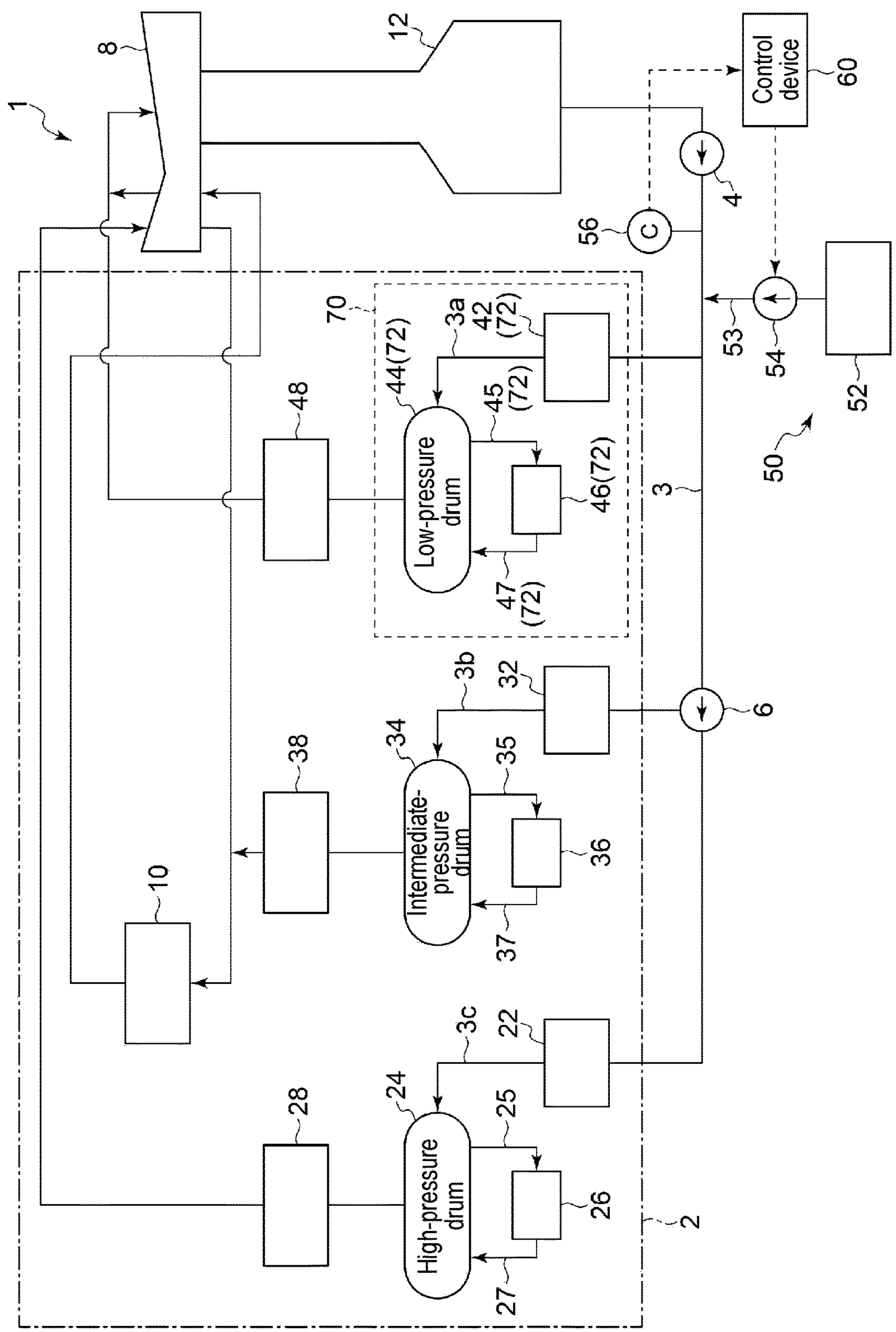
FIG. 1 is a schematic configuration diagram of a steam turbine plant according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

<Configuration of Steam Turbine Plant>

Figure 2:
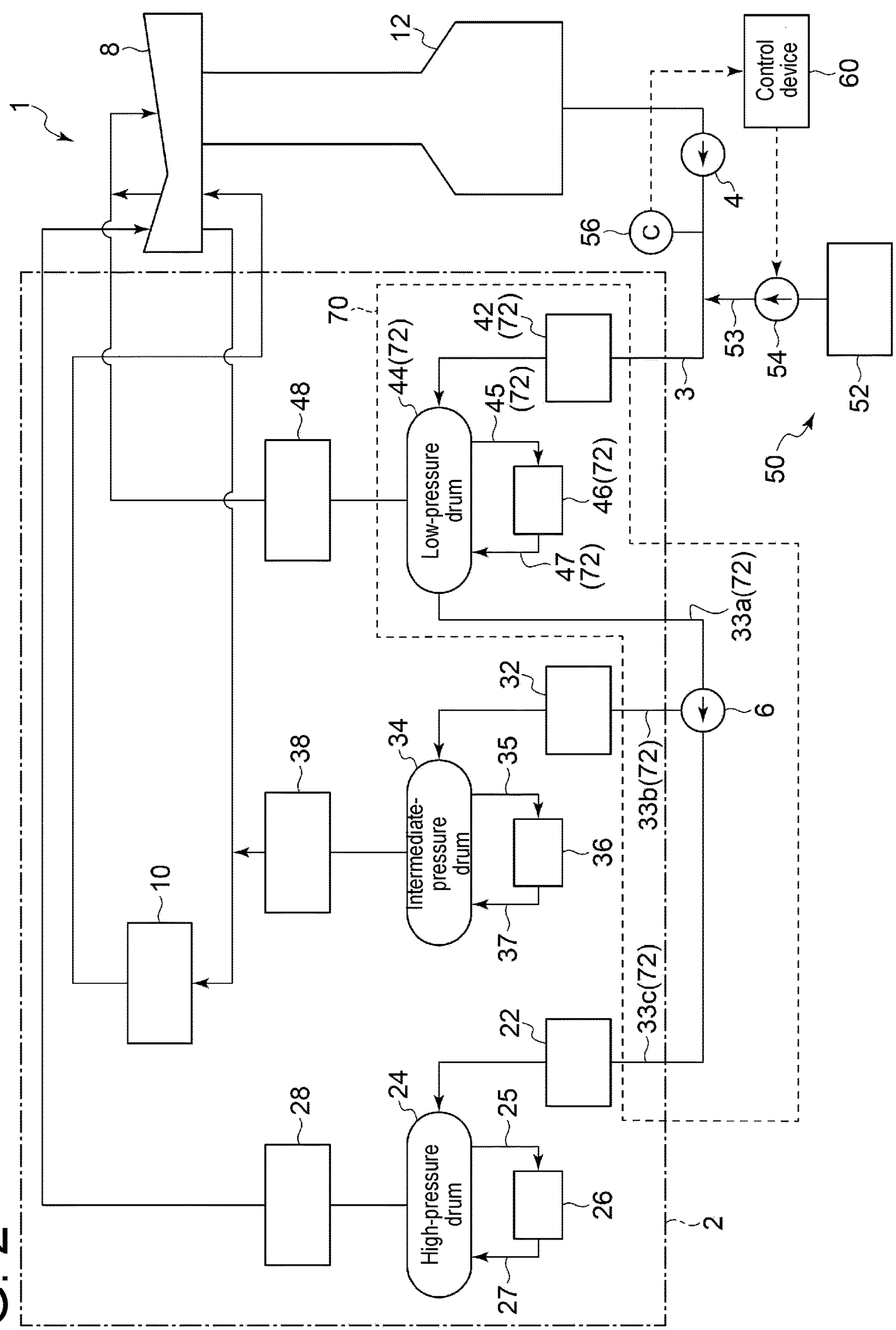
FIG. 2 is a schematic configuration diagram of the steam turbine plant according to an embodiment.

FIGS. 1 and 2 are each a schematic configuration diagram of a steam turbine plant according to an embodiment. As shown in FIGS. 1 and 2, a steam turbine plant 1 includes a heat recovery steam generator 2 (steam generator, boiler) configured to supply an exhaust gas from a gas turbine (not shown), and a steam turbine 8 configured to be driven by steam from the heat recovery steam generator 2. The steam turbine 8 may be configured to drive a generator.

The heat recovery steam generator 2 includes steam drums (24, 34, 44) including a high-pressure drum 24, an intermediate-pressure drum 34, and a low-pressure drum 44, economizers (a high-pressure economizer 22, an intermediate-pressure economizer 32, and a low-pressure economizer 42), evaporators (a high-pressure evaporator 26, an intermediate-pressure evaporator 36, and a low-pressure evaporator 46), and superheaters (a high-pressure superheater 28, an intermediate-pressure superheater 38, and a low-pressure superheater 48) all of which are disposed in correspondence with the respective steam drums (24, 34, 44), and a re-heater 10. An internal pressure of the steam drum (24, 34, 44) during operation of the steam turbine plant 1 is the highest in the high-pressure drum 24, the second highest in the intermediate-pressure drum 34, and the lowest in the low-pressure drum 44.

The economizers (22, 32, 42) are configured to heat feedwater from a water supply line 3 by heat exchange with the exhaust gas. The feedwater heated by the economizers (22, 32, 42) is introduced to each of the steam drums (24, 34, 44) corresponding to the respective economizers.

The steam drums (24, 34, 44) are connected to the evaporators (26, 36, 46) corresponding to the respective steam drums via downcomer tubes (25, 35, 45) and evaporation tubes (27, 37, 47), respectively. The feedwater in the steam drums (24, 34, 44) is introduced to the evaporators (26, 36, 46) via the downcomer tubes (25, 35, 45), respectively.

The evaporators (26, 36, 46) are configured to generate steam by evaporating the feedwater through heat exchange with the exhaust gas. The steam generated by the evaporators (26, 36, 46) flows into the steam drums (24, 34, 44) via the evaporation tubes (27, 37, 47) together with the feedwater (that is, in the form of a two-phase flow). In the steam drums (24, 34, 44), the steam and the feedwater are separated by a gas-liquid separator (not shown), and the steam thus separated is temporarily accommodated in the steam drums (24, 34, 44) as saturated steam. The saturated steam in the steam drums (24, 34, 44) is introduced to each of the superheaters (28, 38, 48) corresponding to the respective steam drums (24, 34, 44).

The superheaters (28, 38, 48) and the re-heater 10 are configured to heat the steam from the steam drums (24, 34, 44) by heat exchange with the exhaust gas. The steam heated by the superheaters (28, 38, 48) and the re-heater 10 is introduced to the steam turbine 8 and rotary drives the steam turbine 8.

The steam from the steam drums (24, 34, 44) is heated by the superheaters (28, 38, 48) corresponding to the respective steam drums, and then introduced to each of a high-pressure turbine portion, an intermediate-pressure turbine portion, and a low-pressure turbine portion of the steam turbine 8. The steam having passed through the high-pressure turbine portion joins the steam from the intermediate-pressure superheater 38 and is introduced to the re-heater 10 to be reheated by the re-heater 10, and then is introduced to the intermediate-pressure turbine portion of the steam turbine 8. The steam having passed through the intermediate-pressure turbine portion joins the steam from the low-pressure superheater 48 and is introduced to the low-pressure turbine portion of the steam turbine 8.

The steam having passed through the low-pressure turbine portion of the steam turbine 8 is introduced to a condenser 12 connected to the low-pressure turbine portion and is condensed by the condenser 12. The resulting condensed water is supplied, as the feedwater, to each of the steam drums (24, 34, 44) via the water supply line 3 and a water supply pump 4.

In the exemplary embodiment shown in FIG. 1, the steam turbine plant 1 is a steam turbine plant of a parallel water supply type where the feedwater from the water supply line 3 and the water supply pump 4 (that is, the feedwater from the condenser 12) is supplied in parallel to the high-pressure drum 24, the intermediate-pressure drum 34, and the low-pressure drum 44.

That is, the water supply line 3 includes a low-pressure branch line 3*a* connected to the low-pressure drum 44, an intermediate-pressure branch line 3*b* connected to the intermediate-pressure drum 34, and a high-pressure branch line 3*c* connected to the high-pressure drum 24, and the feedwater is supplied to each of the low-pressure drum 44, the intermediate-pressure drum 34, the high-pressure drum 24 via the respective branch lines (3*a*, 3*b*, 3*c*). On the water supply line 3, a high-intermediate-pressure water supply pump 6 is disposed upstream of the intermediate-pressure drum 34 and the high-pressure drum 24, and the feedwater pressurized by the high-intermediate-pressure water supply pump 6 is supplied to the intermediate-pressure drum 34 and the high-pressure drum 24.

In the exemplary embodiment shown in FIG. 2, the steam turbine plant 1 is a steam turbine plant of a low-pressure water supply type where the feedwater from the water supply line 3 and the water supply pump 4 (that is, the feedwater from the condenser 12) is supplied to the low-pressure drum 44, as well as part of the feedwater accumulated in the low-pressure drum 44 is discharged from the low-pressure drum 44 and supplied to the intermediate-pressure drum 34 and the high-pressure drum 24.

That is, the low-pressure drum 44 is connected to a high-intermediate-pressure water supply line 33*a* for extracting part of the feedwater from a liquid phase portion of the low-pressure drum 44, and the high-intermediate-pressure water supply line 33*a* includes an intermediate-pressure branch line 33*b* connected to the intermediate-pressure drum 34 and a high-pressure branch line 33*c* connected to the high-pressure drum 24. The feedwater extracted from the low-pressure drum 44 via the high-intermediate-pressure water supply line 33*a* is pressurized by the high-intermediate-pressure water supply pump 6 disposed on the high-intermediate-pressure water supply line 33*a*, and is supplied to each of the intermediate-pressure drum 34 and the high-pressure drum 24 via the respective branch lines (33*b*, 33*c*).

The steam turbine plant 1 shown in FIGS. 1 and 2 includes a chemical supply part 50 for supplying a chemical to the feedwater of the water supply line 3 (that is, the feedwater from the condenser 12). The chemical supply part 50 includes a chemical tank 52, a chemical line disposed between the chemical tank 52 and the water supply line 3, and a chemical pump 54 disposed on the chemical line 53.

The chemical line 53 is connected to the water supply line 3 at a position downstream of the condenser 12 and upstream of the low-pressure economizer 42 (that is, upstream of a branch point of the low-pressure branch line 3*a* in the case of the embodiment shown in FIG. 1). Therefore, the feedwater, where chemicals from the chemical tank 52 and the chemical line 53 are mixed, is supplied to the low-pressure drum 44, the intermediate-pressure drum 34, and the high-pressure drum 24 via the water supply line 3.

The chemical supplied to the feedwater from the chemical supply part 50 may be a pH adjuster for adjusting pH of the feedwater. The pH adjuster may be a corrosion inhibitor for inhibiting corrosion that can be caused in the devices (such as the economizers (22, 32, 42), the steam drums (24, 34, 44), and the like) in contact with the feedwater, when pH of the feedwater falls within a predetermined range.

In the steam turbine plant, corrosion may be caused in the device in contact with the feedwater, if pH of the feedwater is less than a predetermined value. Thus, a basic substance capable of raising pH of the feedwater may be used as the pH adjuster.

As the above-described pH adjuster, ammonia may be used.

The steam turbine plant 1 shown in FIGS. 1 and 2 includes a control device (adjustment part) 60 for adjusting the amount of the chemical supplied to the feedwater of the water supply line 3 by the chemical supply part 50. The control device 60 may be configured to adjust the supply amount of the chemical such that the concentration of the chemical (solute) in the feedwater to be supplied to one of the steam drums (24, 34, 44) (typically, the low-pressure drum 44) has a planned value of a prescribed chemical concentration.

The control device 60 may be configured to adjust the supply amount of the chemical by controlling an output of the chemical pump 54, based on a measurement value of the chemical concentration in the feedwater by a concentration sensor 56. The concentration sensor 56 is disposed on the water supply line 3 at a position downstream of the condenser 12 and upstream of the connection position of the chemical line 53 described above.

The concentration sensor 56 may measure the chemical concentration in the feedwater and transmit the measured chemical concentration to the control device. Alternatively, the concentration sensor 56 may measure an index of the chemical concentration and transmit the measured chemical concentration to the control device. For example, the concentration sensor 56 may measure an electric conductivity (conductivity) of the feedwater as the index of the chemical concentration, and transmit the chemical concentration in the feedwater converted based on the electric conductivity to the control device. Alternatively, the electric conductivity of the feedwater measured by the concentration sensor 56 may be converted into a solute concentration by the control device 60.

The steam turbine plant according to the embodiment of the present invention is not limited to the steam turbine plant 1 including the heat recovery steam generator 2 described above, but may be, for example, a steam turbine plant which is configured to drive the steam turbine by steam generated by a boiler for combusting fuel such as coal, oil, liquefied natural gas, heavy oil, or the like. Further, the steam turbine plant according to some embodiments may be a nuclear power plant which includes a steam generator for generating steam by heat extracted from a reactor.

Of the components constituting the steam turbine plant 1, in the pipe or the device inside of which the feedwater passes, with an internal temperature being about not less than 120° C. and not greater than 180° C., flow accelerated corrosion (FAC) is likely to be caused if the feedwater inside the components has less than pH 9.8. Hereinafter, in the present specification, a temperature range of not less than 120° C. and not greater than 180° C. will be referred to as a FAC temperature range.

In some embodiments, the steam turbine plant 1 includes carbon steel components 72 configured such that the internal temperature at least partially falls within the temperature range of not less than 120° C. and not greater than 180° C. (FAC temperature range) under a load operating condition of the steam turbine plant 1. The carbon steel components 72 include the pipe or the device formed from carbon steel, and are configured to internally pass the feedwater supplied from the water supply line 3 to the heat recovery steam generator 2 (steam generator, boiler). Then, under the load operating condition of the steam turbine plant 1, the control device 60 (adjustment part) adjusts the supply amount of the pH adjuster by the chemical supply part 50 such that pH of the feedwater in each of the carbon steel components 72 is not less than 9.8.

The carbon steel components 72 include neither the pipe nor the device in which the internal temperature falls within the FAC temperature range only in a no-load operation such as in startup of the plant and the internal temperature does not fall within the FAC temperature range under the load operating condition (such as a rated load operating condition or a partial load operating condition).

In some embodiments, the carbon steel component 72 includes the low-pressure drum 44. In some embodiments, the internal temperature of the low-pressure drum 44 under the load operating condition (such as the rated load operating condition or the partial load operating condition) is about from 140° C. to 160° C.

Further, in some embodiments, the carbon steel component 72 may include at least one of the low-pressure economizer 42, the low-pressure evaporator 46, the downcomer tube 45, the evaporation tube 47, or a portion of the low-pressure branch line 3*a* (pipe) between the low-pressure economizer 42 and the low-pressure drum 44. These pipes or devices have at least partially the same internal temperature as the internal temperature of the low-pressure drum 44 under the load operating condition.

In some embodiments, the carbon steel component 72 may include a high-intermediate-pressure water supply line 33*a* including the intermediate-pressure branch line 33*b* and the high-pressure branch line 33*c* (see FIG. 2). These pipes have the same internal temperature as the internal temperature of the low-pressure drum 44 under the load operating condition.

In some embodiments, carbon steel which is a material for the carbon steel component 72 is carbon steel whose chromium (Cr) content is not greater than 0.2 wt %. The above-described carbon steel may include, for example, carbon steel for boiler and pressure vessel (SB material such as SB410 or SB450), carbon steel for mechanical structure (such as S15C, S25C, S35C, S45C, S55C, S15CK), or carbon steel for high-temperature pipe (STPT material such as STPT38, STPT49).

In the above-described embodiment, the carbon steel components 72 are adopted as components (such as the pipes or the devices) for a section where the internal temperature is not less than 120° C. and not greater than 180° C. (within the FAC temperature range) during the operation in the steam turbine plant 1, and the pH adjuster is supplied such that pH of the feedwater in each of the carbon steel components 72 is not less than 9.8. Therefore, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

Hereinafter, the exemplary embodiments shown in FIGS. 1 and 2 will be described in more detail. In FIGS. 1 and 2, a region surrounded by a dashed line is a FAC region 70 where the internal temperature in the device or the pipe falls within the range of not less than 120° C. and not greater than 180° C. (FAC temperature range) in the load operating state of the steam turbine plant 1, and the carbon steel components 72 are disposed.

The steam turbine plant shown in FIG. 1 is the steam turbine plant 1 of the parallel water supply type which includes the low-pressure drum 44 (first drum) supplied with the feedwater from the condenser 12 and having the lowest internal pressure among the plurality of steam drums (24, 34, 44), and the intermediate-pressure drum 34 (second drum) supplied with the feedwater from the condenser 12 and having the higher internal pressure than the low-pressure drum 44 (first drum). In the embodiment shown in FIG. 1, the carbon steel component 72 include the low-pressure drum 44 (first drum). Then, the control device 60 is configured to adjust the supply amount of the pH adjuster such that pH of the feedwater to be supplied to the low-pressure drum 44 (that is, the feedwater upstream of the low-pressure drum 44) is not less than 10.1.

Further, in the exemplary embodiment shown in FIG. 1, the carbon steel components 72 include the low-pressure economizer 42, the low-pressure evaporator 46, the downcomer tube 45, the evaporation tube 47, and a portion of the low-pressure branch line 3*a* (pipe) between the low-pressure economizer 42 and the low-pressure drum 44.

If the feedwater containing the pH adjuster is supplied to the low-pressure drum 44, a part of the pH adjuster (solute) is moved (evaporated) from the liquid phase to the gas phase in the low-pressure drum 44 and the low-pressure evaporator 46, making the solute concentration in the feedwater in the low-pressure drum 44 lower than the solute concentration in the feedwater upstream of the low-pressure drum 44. Therefore, in a case where chemical (for example, the basic substance such as ammonia) for raising pH of the feedwater is used as the pH adjuster, pH of the feedwater in the low-pressure drum 44 is lower than pH of the feedwater upstream of the low-pressure drum 44.

In this regard, according to the findings of the present inventors, in the case of the steam turbine plant of the parallel water supply type, if ammonia which is an evaporable volatile pH adjuster is used, it is possible to make pH of the feedwater accumulated in the low-pressure drum 44 (first drum; internal pressure of about 0.35 to 0.6 MPa) not less than 9.8 as long as pH of the feedwater to be supplied to the low-pressure drum 44 is not less than 10.1. Thus, according to the above-described embodiment, typically, in the low-pressure drum 44 where flow accelerated corrosion is likely to be caused, it is possible to effectively inhibit the flow accelerated corrosion, while adopting the components made of relatively inexpensive carbon steel.

Further, in the above-described embodiment, the low-pressure evaporator 46, the downcomer tube 45, and the evaporation tube 47 have the same pressure-temperature condition as the low-pressure drum 44, and the feedwater passing through these devices has the same pH (that is, not less than pH 9.8) as the feedwater in the low-pressure drum 44. Furthermore, in the above-described embodiment, the low-pressure economizer 42 and the portion of the low-pressure branch line 3*a* (pipe) between the low-pressure economizer 42 and the low-pressure drum 44 are located upstream of the low-pressure drum 44, and thus have the same pH (that is, not less than pH 10.1) as the feedwater to be supplied to the low-pressure drum 44. Thus, according to the above-described embodiment, in the device where flow accelerated corrosion can be caused, it is possible to effectively inhibit the flow accelerated corrosion, while adopting the components made of relatively inexpensive carbon steel.

In the case of the steam turbine plant 1 of the parallel water supply type, pH of the feedwater, which is accumulated in the intermediate-pressure drum 34 and the high-pressure drum 24 having higher internal pressure than the low-pressure drum 44 (first drum), is higher. Therefore, even if the intermediate-pressure drum 34 or the high-pressure drum 24 is the carbon steel component (that is, even if the internal temperature of the intermediate-pressure drum 34 or the high-pressure drum 24 is not less than 120° C. and not greater than 180° C.), it is possible to appropriately inhibit flow accelerated corrosion in the intermediate-pressure drum 34 or the high-pressure drum 24.

The steam turbine plant 1 shown in FIG. 2 is the steam turbine plant 1 of the low-pressure water supply type which includes the low-pressure drum 44 (first drum) supplied with the feedwater from the condenser 12 and having the lowest internal pressure among the plurality of steam drums (24, 34, 44), and the intermediate-pressure drum 34 (second drum) supplied with the feedwater discharged from the low-pressure drum 44 (first drum) and having the higher internal pressure than the low-pressure drum 44.

In the exemplary embodiment shown in FIG. 2, the carbon steel component 72 includes the low-pressure drum 44 (first drum). Then, the control device 60 is configured to adjust the supply amount of the pH adjuster such that pH of the feedwater to be supplied to the low-pressure drum 44 (that is, the feedwater upstream of the low-pressure drum 44) is not less than 9.8.

Further, in the exemplary embodiment shown in FIG. 2, the carbon steel components 72 include the low-pressure economizer 42, the low-pressure evaporator 46, the downcomer tube 45, the evaporation tube 47, and a portion of the water supply line 3 (pipe) between the low-pressure economizer 42 and the low-pressure drum 44.

Further, in the exemplary embodiment shown in FIG. 2, the carbon steel component 72 includes the high-intermediate-pressure water supply line 33*a* including the intermediate-pressure branch line 33*b* and the high-pressure branch line 33*c*.

According to the findings of the present inventors, in the case of the steam turbine plant of the low-pressure water supply type, if ammonia which is the evaporable volatile pH adjuster is used, it is possible to make pH of the feedwater accumulated in the low-pressure drum 44 (first drum; internal pressure of about 0.35 to 0.6 MPa) not less than 9.8 as long as pH of the feedwater to be supplied to the low-pressure drum 44 is not less than 9.8. Thus, according to the above-described embodiment, typically, in the low-pressure drum 44 where flow accelerated corrosion is likely to be caused, it is possible to effectively inhibit the flow accelerated corrosion, while adopting the components made of relatively inexpensive carbon steel.

Further, in the above-described embodiment, the low-pressure evaporator 46, the downcomer tube 45, the evaporation tube 47, and the high-intermediate-pressure water supply line 33*a* including the intermediate-pressure branch line 33*b* and the high-pressure branch line 33*c* have the same pressure-temperature condition as the low-pressure drum 44, and the feedwater passing through these devices has the same pH (that is, not less than pH 9.8) as the feedwater in the low-pressure drum 44. Furthermore, in the above-described embodiment, the low-pressure economizer 42 and the portion of the water supply line 3 (pipe) between the low-pressure economizer 42 and the low-pressure drum 44 are located upstream of the low-pressure drum 44, and thus have the same pH (that is, not less than pH 9.8) as the feedwater to be supplied to the low-pressure drum 44. Thus, according to the above-described embodiment, in the device where flow accelerated corrosion can be caused, it is possible to effectively inhibit the flow accelerated corrosion, while adopting the components made of relatively inexpensive carbon steel.

In some embodiments, the above-described pH adjuster includes a volatile substance.

In some embodiments, the volatile substance may be a substance having higher steam pressure than water.

Since the pH adjuster having the higher steam pressure than water and relatively high volatility is evaporable, if such volatile pH adjuster is used, it may be difficult to obtain a desired pH adjustment effect especially under a low-pressure condition (such as the low-pressure drum 44). In this regard, according to the above-described embodiment, in the case where the substance having the higher steam pressure than water and relatively high volatility is used as the pH adjuster, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

In some embodiments, the above-described pH adjuster includes ammonia.

Since ammonia has a higher steam pressure than water and relatively high volatility, if ammonia is used as the pH adjuster, it may be difficult to obtain the desired pH adjustment effect especially under the low-pressure condition (such as the low-pressure drum 44). In this regard, according to the above-described embodiment, in the case where ammonia is used as the pH adjuster, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

The contents described in the above embodiments would be understood as follows, for instance.

(1) A steam turbine plant (1) according to at least one embodiment of the present invention includes a chemical supply part (50) configured to supply a pH adjuster (such as ammonia) to feedwater to a steam generator (such as a heat recovery steam generator 2), an adjustment part (such as the control device 60) for adjusting a supply amount of the pH adjuster to the feedwater by the chemical supply part, and at least one carbon steel component (72) that includes a pipe or a device formed from carbon steel and through which the feedwater flows, the carbon steel component being configured such that an internal temperature at least partially falls within a range of not less than 120° C. and not greater than 180° C. under load operating condition of the steam turbine plant. The adjustment part is configured to, under the load operating condition, adjust the supply amount of the pH adjuster such that pH of the feedwater in each of the at least one carbon steel component is not less than 9.8.

With the above configuration (1), the component made of carbon steel is adopted as a component for a section where the internal temperature is not less than 120° C. and not greater than 180° C. during the operation in the steam turbine plant, and the pH adjuster is supplied such that pH of the feedwater in each of the carbon steel components is not less than 9.8. Therefore, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

(2) In some embodiments, in the above configuration (1), the pH adjuster includes a volatile substance.

Since the volatile pH adjuster is evaporable, if such volatile pH adjuster is used, it may be difficult to obtain a desired pH adjustment effect especially under low-pressure condition. In this regard, with the above configuration (2), in the case where the volatile substance is used as the pH adjuster, as described in the above configuration (1), it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

(3) In some embodiments, in the above configuration (1) or (2), the pH adjuster includes ammonia.

Since ammonia has a higher steam pressure than water and relatively high volatility, if ammonia is used as the pH adjuster, it may be difficult to obtain the desired pH adjustment effect especially under the low-pressure condition. In this regard, with the above configuration (3), in the case where ammonia is used as the pH adjuster, as described in the above configuration (1), it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

(4) In some embodiments, in the above configuration (3), the steam turbine plant includes one or more steam drums (such as the high-pressure drum 24, the intermediate-pressure drum 34, and the low-pressure drum 44) for temporarily accommodating steam generated by a boiler (such as the heat recovery steam generator 2) serving as the steam generator.

The one or more steam drums include a first drum (such as the low-pressure drum 44) supplied with the feedwater from a condenser (12) and having a lowest internal pressure among the one or more steam drums, and a second drum (such as the intermediate-pressure drum 34) supplied with the feedwater from the condenser and having a higher internal pressure than the first drum, the at least one carbon steel component includes the first drum, and the adjustment part is configured to, under the load operating condition, adjust the supply amount of the pH adjuster such that pH of the feedwater to be supplied to the first drum is not less than 10.1.

In the present specification, the steam turbine plant where the feedwater from the condenser is supplied to each of the first drum and the second drum which are different in internal pressure is referred to as the steam turbine plant of the parallel water supply type.

According to the findings of the present inventors, in the case of the steam turbine plant of the parallel water supply type, even if the evaporable volatile pH adjuster is used, it is possible to make pH of the feedwater, which is accumulated in the first drum (low-pressure drum) having the lowest internal pressure, not less than 9.8 as long as pH of the feedwater to be supplied to the first drum is not less than 10.1. Thus, with the above configuration (4), typically, in the first drum where flow accelerated corrosion is likely to be caused, it is possible to effectively inhibit the flow accelerated corrosion, while adopting the components made of relatively inexpensive carbon steel. Further, in the case of the steam turbine plant of the parallel water supply type, pH of the feedwater, which is accumulated in the second drum having higher internal pressure than the first drum, is higher. Therefore, even if the second drum is the carbon steel component (that is, even if the internal temperature of the second drum is not less than 120° C. and not greater than 180° C.), it is possible to appropriately inhibit the flow accelerated corrosion in the second drum. Thus, with the above configuration (4), it is possible to effectively reduce wastage due to the flow accelerated corrosion, while suppressing the increase in plant producing cost.

(5) In some embodiments, in the above configuration (3), the steam turbine plant includes one or more steam drums (such as the high-pressure drum 24, the intermediate-pressure drum 34, and the low-pressure drum 44) for temporarily accommodating steam generated by a boiler serving as the steam generator (such as the heat recovery steam generator 2). The one or more steam drums include a first drum (such as the low-pressure drum 44) supplied with the feedwater from a condenser and having a lowest internal pressure among the one or more steam drums, and a second drum (such as the intermediate-pressure drum 34) supplied with the feedwater discharged from the first drum and having a higher internal pressure than the first drum, the at least one carbon steel component includes the first drum, and the adjustment part is configured to, under the load operating condition, adjust the supply amount of the pH adjuster such that pH of the feedwater to be supplied to the first drum is not less than 9.8.

In the present specification, the steam turbine plant where the feedwater from the condenser is supplied to the first drum (low-pressure drum) having the lowest internal pressure among the one or more steam drums and the feedwater discharged from the first drum is supplied to the second drum having the higher internal pressure than the first drum is referred to as the steam turbine plant of the low-pressure water supply type.

According to the findings of the present inventors, in the case of the steam turbine plant of the low-pressure water supply type, even if the evaporable volatile pH adjuster is used, it is possible to make pH of the feedwater, which is accumulated in the first drum (low-pressure drum) having the lowest internal pressure, not less than 9.8 as long as pH of the feedwater to be supplied to the first drum is not less than 9.8. Thus, with the above configuration (5), typically, in the first drum where flow accelerated corrosion is likely to be caused, it is possible to effectively inhibit the flow accelerated corrosion, while adopting the components made of relatively inexpensive carbon steel. Thus, it is possible to effectively reduce wastage due to the flow accelerated corrosion, while suppressing the increase in plant producing cost.

(6) In some embodiments, in any one of the above configurations (1) to (5), the adjustment part is configured to decide the supply amount of the pH adjuster to the feedwater based on a concentration of the pH adjuster in the feedwater to be supplied to the steam generator or an index indicating the concentration.

With the above configuration (6), since the supply amount of the pH adjuster to the feedwater is decided based on the concentration of the pH adjuster in the feedwater to be supplied to the steam generator or the index indicating the concentration, it is possible to appropriately adjust the concentration of the pH adjuster in the feedwater. Thus, it is possible to set pH of the feedwater in each of the carbon steel components in the appropriate range (not less than pH 9.8), and to appropriately inhibit flow accelerated corrosion in the carbon steel component.

(7) A control device (60) according to at least one embodiment of the present invention is a control device for a steam turbine plant including a chemical supply part (50) configured to supply a pH adjuster to feedwater to a steam generator, and at least one carbon steel component (72) that includes a pipe or a device formed from carbon steel and through which the feedwater flows, the carbon steel component being configured such that an internal temperature at least partially falls within a range of not less than 120° C. and not greater than 180° C. under load operating condition of the steam turbine plant (1). The control device is configured to, under the load operating condition, adjust the supply amount of the pH adjuster to the feedwater by the chemical supply part such that pH of the feedwater in each of the at least one carbon steel component is not less than 9.8.

With the above configuration (7), the component made of carbon steel is adopted as a component (a pipe, a device, or the like) for a section where the internal temperature can be not less than 120° C. and not greater than 180° C. during the operation in the steam turbine plant, and the pH adjuster is supplied such that pH of the feedwater in each of the carbon steel components is not less than 9.8 under the operating condition where the internal temperature of the carbon steel component is not less than 120° C. and not greater than 180° C. Therefore, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

(8) A water quality management method for a steam turbine plant (1) according to at least one embodiment of the present invention is a water quality management method for a steam turbine plant including at least one carbon steel component (72) that includes a pipe or a device formed from carbon steel and through which feedwater flows, the carbon steel component being configured such that an internal temperature at least partially falls within a range of not less than 120° C. and not greater than 180° C. under load operating condition of the steam turbine plant, the water quality management method including a step of supplying a pH adjuster to the feedwater to a steam generator, and a step of, under the load operating condition, adjusting the supply amount of the pH adjuster such that pH of the feedwater in each of the at least one carbon steel component is not less than 9.8.

With the above method (8), the component made of carbon steel is adopted as a component for a section where the internal temperature can be not less than 120° C. and not greater than 180° C. during the operation in the steam turbine plant, and the pH adjuster is supplied such that pH of the feedwater in each of the carbon steel components is not less than 9.8 under the operating condition where the internal temperature of the carbon steel component is not less than 120° C. and not greater than 180° C. Therefore, it is possible to more reliably inhibit flow accelerated corrosion in the section where the flow accelerated corrosion is likely to be caused, while adopting the components made of relatively inexpensive carbon steel as the components for the concerned section. Thus, it is possible to reduce wastage due to the flow accelerated corrosion, while suppressing the increase in plant producing cost.

Embodiments of the present invention were described in detail above, but the present invention is not limited thereto, and also includes an embodiment obtained by modifying the above-described embodiments and an embodiment obtained by combining these embodiments as appropriate.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, an expression of a shape such as a rectangular shape or a cylindrical shape shall not be construed as only the geometrically strict shape, but also includes a shape with unevenness or chamfered corners within the range in which the same effect can be achieved.

As used herein, the expressions "comprising", "including" or "having" one constitutional element is not an exclusive expression that excludes the presence of other constitutional elements.

REFERENCE SIGNS LIST

1 Steam turbine plant
2 Heat recovery steam generator
3 Water supply line
3*a* Low-pressure branch line
3*b* Intermediate-pressure branch line
3*c* High-pressure branch line
4 Water supply pump
6 High-intermediate-pressure water supply pump
8 Steam turbine
10 Re-heater
12 Condenser
22 High-pressure economizer
24 High-pressure drum
26 High-pressure evaporator
28 High-pressure superheater
32 Intermediate-pressure economizer
33*a* High-intermediate-pressure water supply line
33*b* Intermediate-pressure branch line
33*c* High-pressure branch line
34 Intermediate-pressure drum
35 Downcomer tube
36 Intermediate-pressure evaporator
37 Evaporation tube
38 Intermediate-pressure superheater
42 Low-pressure economizer
44 Low-pressure drum
45 Downcomer tube
46 Low-pressure evaporator
47 Evaporation tube
48 Low-pressure superheater
50 Chemical supply part
52 Chemical tank
53 Chemical line
54 Chemical pump
56 Concentration sensor
60 Control device
70 FAC region
72 Carbon steel component

The invention claimed is:

1. A steam turbine plant, comprising:

a chemical supply part configured to supply a pH adjuster to feedwater to a steam generator;

an adjustment part for adjusting a supply amount of the pH adjuster to the feedwater by the chemical supply part; and at least one carbon steel component which includes a pipe or a device formed from carbon steel and through which the feedwater flows, the carbon steel component being configured such that an internal temperature at least partially falls within a range of not less than 120° C. and not greater than 180° C. under a load operating condition of the steam turbine plant, wherein the adjustment part is configured to, under the load operating condition, adjust the supply amount of the pH adjuster such that pH of the feedwater in each of the at least one carbon steel component is not less than 9.8, wherein the pH adjuster includes ammonia, wherein the steam turbine plant comprises one or more steam drums for temporarily accommodating steam generated by a boiler serving as the steam generator, wherein the one or more steam drums include:

a first drum supplied with the feedwater from a condenser and having a lowest internal pressure among the one or more steam drums; and a second drum supplied with the feedwater from the condenser not via the first drum and having a higher internal pressure than the first drum, wherein the at least one carbon steel component includes the first drum, and wherein the adjustment part is configured to, under the load operating condition, adjust the supply amount of the pH adjuster such that pH of the feedwater to be supplied to the first drum is not less than 10.1.

2. The steam turbine plant according to claim 1, wherein the pH adjuster includes a volatile substance.

3. The steam turbine plant according to claim 1, wherein the adjustment part is configured to decide the supply amount of the pH adjuster to the feedwater based on a concentration of the pH adjuster in the feedwater to be supplied to the steam generator or an index indicating the concentration.

4. A control device for controlling a steam turbine plant, the steam turbine plant comprising:

a chemical supply part configured to supply a pH adjuster to feedwater to a steam generator; and at least one carbon steel component which includes a pipe or a device formed from carbon steel and through which the feedwater flows, the carbon steel component being configured such that an internal temperature at least partially falls within a range of not less than 120° C. and not greater than 180° C. under load operating condition of the steam turbine plant, wherein the control device is configured to, under the load operating condition, adjust the supply amount of the pH adjuster to the feedwater by the chemical supply part such that pH of the feedwater in each of the at least one carbon steel component is not less than 9.8, wherein the pH adjuster includes ammonia, wherein the steam turbine plant comprises one or more steam drums for temporarily accommodating steam generated by a boiler serving as the steam generator, wherein the one or more steam drums include:

a first drum supplied with the feedwater from a condenser and having a lowest internal pressure among the one or more steam drums; and a second drum supplied with the feedwater from the condenser not via the first drum and having a higher internal pressure than the first drum, wherein the at least one carbon steel component includes the first drum, and wherein the control device is configured to, under the load operating condition, adjust the supply amount of the pH adjuster such that pH of the feedwater to be supplied to the first drum is not less than 10.1.

5. A water quality management method for a steam turbine plant, the steam turbine plant including at least one carbon steel component which includes a pipe or a device formed from carbon steel and through which feedwater flows, the carbon steel component being configured such that an internal temperature at least partially falls within a range of not less than 120° C. and not greater than 180° C. under a load operating condition of the steam turbine plant, the water quality management method comprising:

a step of supplying a pH adjuster to the feedwater to a steam generator; and a step of, under the load operating condition, adjusting the supply amount of the pH adjuster such that pH of the feedwater in each of the at least one carbon steel component is not less than 9.8, wherein the pH adjuster includes ammonia, wherein the steam turbine plant comprises one or more steam drums for temporarily accommodating steam generated by a boiler serving as the steam generator, wherein the one or more steam drums include:

a first drum supplied with the feedwater from a condenser and having a lowest internal pressure among the one or more steam drums; and a second drum supplied with the feedwater from the condenser not via the first drum and having a higher internal pressure than the first drum, wherein the at least one carbon steel component includes the first drum, and wherein the method further comprises, under the load operating condition, adjusting the supply amount of the pH adjuster such that pH of the feedwater to be supplied to the first drum is not less than 10.1.

* * * * *